MARCUS T. HITCHCOCK.

CAR VENTILATOR.

REISSUED AUG 1 1871

4494

Witnesses.

Clarence Buckland.
C. E. Howard.

Marcus T. Hitchcock, Inventor,
By L. A. Curtis, his attorney.

AM. PHOTO-LITHOGRAPHIC CO. N.Y. (OSBORNE'S PROCESS.)

UNITED STATES PATENT OFFICE.

MARCUS T. HITCHCOCK, OF SPRINGFIELD, MASSACHUSETTS, ASSIGNOR TO JOHN W. LABAREE.

IMPROVEMENT IN RAILROAD-CAR VENTILATORS.

Specification forming part of Letters Patent No. 74,534, dated February 18, 1868; reissue No. 4,005, dated May 31, 1870; reissue No. 4,494, dated August 1, 1871.

*To all whom it may concern:*

Be it known that I, MARCUS T. HITCHCOCK, of Springfield, in the county of Hampden and State of Massachusetts, have invented a new and Improved Car-Ventilator; and I do hereby declare that the following is a full, clear, and exact description thereof, which will enable others skilled in the art to make and use the same, reference being had to the accompanying drawing forming part of this specification, in which—

Figure 1:
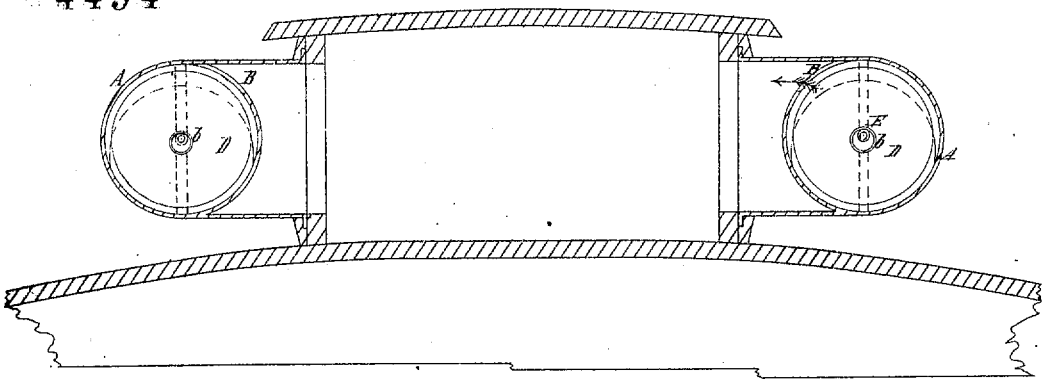
Figure 2:
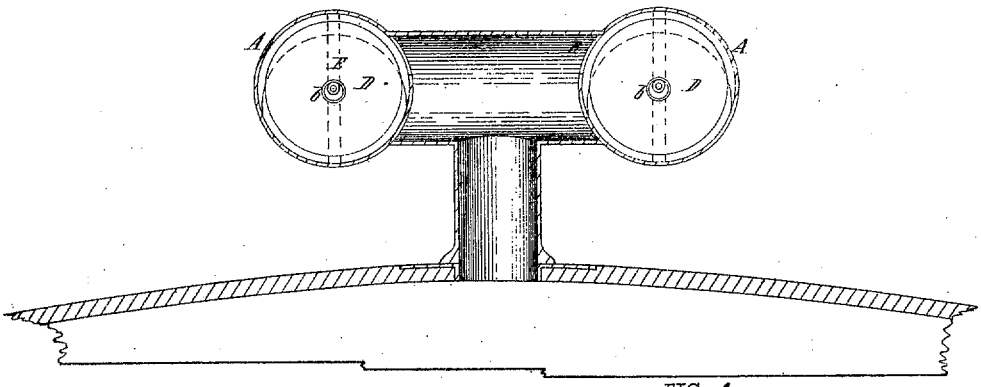
Figure 3:
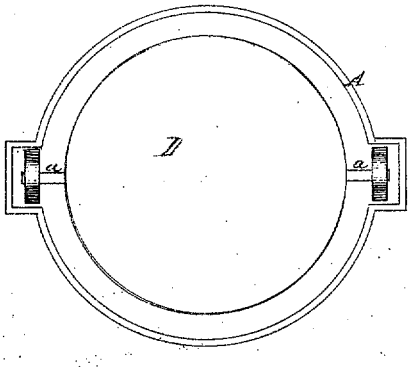
Figure 4:
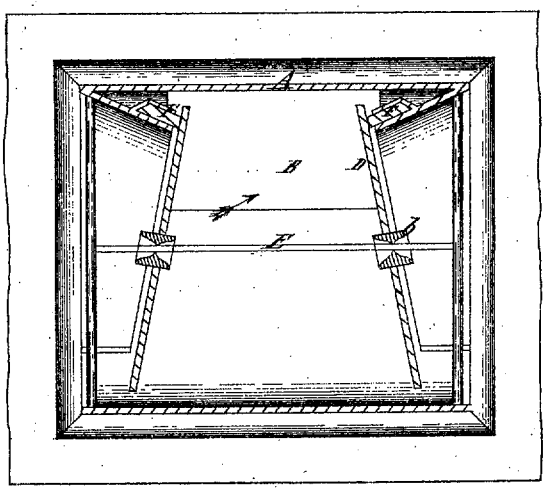

Figure 1 represents a vertical transverse section of my improved car-ventilator. Fig. 2 is a similar view representing a modification of the same. Fig. 3 is a similar view representing another modification. Fig. 4 is a vertical longitudinal section of the same.

Similar letters of reference indicate corresponding parts.

This invention relates to a new car-ventilator, in which a sliding valve is employed, which is moved by the wind to the rear end of its case or shell, in whatever direction the car may advance. The abutments at the ends of the case against which the valve strikes are made of elastic material, so as to deaden the noise when the valve strikes against the abutment at the top. The valve is hung so that it can slide on its bearings, and that it can also oscillate on the bearings for the purpose of allowing the valve to assume an inclined position when reaching the end of the case, which position is produced by the shape of the abutment, and which is so formed that the upper edge of the valve is nearer to the front than the lower edge, so that solid bodies, such as cinders, dust, or sparks, may, by the position of the valve, be caused to slide down on the same to the bottom of the case. Between the lower edge of the valve and the bottom of the case is left an open space for the purpose of discharging solid bodies blown into the ventilator, and also the surplus wind. The fresh air is conducted into the car by a suitable channel, from the side or upper part of the case. The ventilator can be conveniently attached to the roofs of all kinds of cars, and will be automatic, as it will at once adjust itself to the motion of the car, in whatever direction the same may move.

A in the drawing represents the shell or case of my improved ventilator. The same is of cylindrical cross-section, with parallel sides. The shell is made of suitable material, with open ends, and is, by means of a channel, B, connected with the interior of a car. On cars on which a deck is formed above the roof, as in Fig. 1, the ventilator can be easily attached to the edges of the deck, as shown in Fig. 1; but where no such deck is provided, as in Fig. 2, the ventilators are attached on opposite sides, if desired, to an upright tube, C, projecting from the roof, and connecting the channels B with the interior of the car, as is clearly indicated in Fig. 2. Within the shell A is arranged a sliding valve, D, which is either hung upon a rod, E, that extends longitudinally through the case, as in Figs. 1, 2, and 4, or said valve is provided with trunnions *a a*, that are fitted into grooves on the sides of the shell, the trunnions carrying friction-rollers operating in said grooves, as is clearly shown in Fig. 3. If the valve is hung on the rod E it is provided with a hub, *b*, the bore of which is narrowest in the middle and flaring to both ends, as is clearly shown in Fig. 4. The object of the so-constructed hub is to allow the valve to assume a certain inclined position at each end of the case, as indicated in Fig. 4. If the valve is hung at both ends, as in Fig. 3, it will oscillate easily around its pivots. At each end of the case A is arranged, within the upper part of the same, an abutment, F, which is lined with India rubber or other suitable elastic material, and which is so shaped as to cause the valve D, when the same is blown against it by the wind, to assume an inclined position, with its lower part nearest the outer end of the case, as shown in Fig. 4. The lower part of the valve D does not reach the bottom of the case A, so that a space is left there, as shown. The abutments above mentioned consist, it will be seen, of the exposed rims or edges of two plates, one at each end of the shell. The opposite rims or edges of said abutments are attached to the rims or edges of the shell at each end, so that, as said abutments are secured within the shell, they form deflectors, one at each end, by means of which the air, with whatever cinders or dirt may be carried with it, is deflected downward as it enters the shell, so as to strike the movable deflector or sliding valve D. When this occurs the cinders and other heavier bodies slide down the deflector or valve D, while the air, receiving a check, fills the space between the front of this deflector and the back of the front deflector, and a part thereof, freed from the cinders, passes into the car through the channel or passage made in the upper part of the shell for that purpose, as before mentioned.

The operation is as follows: In whatever direction the car moves, the wind, entering the front end of the car A, will drive the valve toward the rear end of the same against the abutment provided therein. Owing to the inclined position of the valve, all solid bodies thrown against it by the force of the draught will fall to the bottom of the case, and will be blown out through the space left between the same and the lower edge of the valve. The pure air will enter the body of the car through the channel B. If the motion of the car is reversed, the valve will at once reverse its position in the shell A, and also its inclined position, as indicated in Fig. 4, the valve always being in the rear end of the shell.

I have spoken of the shell or case as of cylindrical cross-section with parallel sides. The advantage of the cylindrical part of its form is its facilitating the passage of the cleansed air into the car through the channel B. The square shells used before my invention were found to produce, by their square form, eddies, which interfered with such free passage of the cleansed air. Of course I do not understand my invention in this respect to be limited to a shell or case with the part in question formed to have a mathematically-cylindrical cross-section, but to embrace such as are substantially so formed for the purpose described, whether the curve deviate more or less from a true cylinder, or whether it be a true curve or one formed by many short sides.

This ventilator possesses many superior advantages over those now in use. The most important of these advantages are the following: It separates the pure air from the impure substances contained therein, and causes only the pure air to enter the car; it is automatic, and adjusts itself at once to the motion of the car; it is noiseless and is of very simple construction, can be cheaply made, and cannot easily get out of order, as those which are provided with hinged valves can.

Having thus described my invention, what I claim as new, and desire to secure by Letters Patent, is—

1. The hub *b* of the sliding valve, when constructed as described, so that both a sliding and an oscillating motion can be imparted to the valve, as set forth.

2. Providing the case or shell A, in which the sliding valve D moves, with elastic abutments F F, which are so arranged that the valve when striking against one of the abutments will be brought into an inclined position, substantially as and for the purpose herein shown and described.

3. The shell or case A, when provided with elastic abutments F F, in combination with the sliding oscillating valve D and with the channel B, all made so that the lower edge of the valve does not come in contact with the bottom of the shell, and all operating substantially in the manner herein shown and described.

4. The shell or case A, formed substantially as described, in combination with the channel B, and the deflector in front and the deflector in rear of said channel, substantially as described, the whole combination operating to separate the pure air from the impure substances contained therein, and cause the pure air to enter the car, as described.

MARCUS T. HITCHCOCK.

Witnesses:
T. A. CURTIS,
CLARENCE BUCKLAND.